United States Patent [19]
Hardin et al.

[11] Patent Number: 5,415,144
[45] Date of Patent: May 16, 1995

[54] THROTTLE POSITION VALIDATION METHOD AND APPARATUS

[75] Inventors: George T. Hardin; James A. Keller; Earl C. Pearson, all of Knoxville, Tenn.

[73] Assignee: Robertshaw Controls Company, Richmond, Va.

[21] Appl. No.: 182,625

[22] Filed: Jan. 14, 1994

[51] Int. Cl.⁶ ............................................. F02D 7/00
[52] U.S. Cl. ................................................ 123/399
[58] Field of Search ............... 123/399, 478, 493, 494, 123/397, 361, 339; 180/197, 335; 338/153, 172, 174, 200; 333/184; 73/118.1, 513; 364/431.05

[56] References Cited

U.S. PATENT DOCUMENTS

| | | | |
|---|---|---|---|
| 2,192,714 | 3/1940 | Norman et al. | 123/399 |
| 3,837,321 | 9/1974 | Sauer | 123/399 |
| 3,858,561 | 1/1975 | Aono | 123/399 |
| 3,911,872 | 10/1975 | Hughes | 123/399 |
| 3,926,153 | 12/1975 | Reddy | 123/399 |
| 4,133,320 | 1/1979 | Bianchi et al. | 123/399 |
| 4,305,359 | 12/1981 | Mann et al. | 123/333 |
| 4,308,838 | 1/1982 | Nakano et al. | 123/492 |
| 4,355,293 | 10/1982 | Driscoll | 333/184 |
| 4,528,590 | 7/1985 | Bisacquino et al. | 338/153 |
| 4,532,908 | 8/1985 | Steinbrenner | 123/493 |
| 4,603,675 | 8/1986 | Junginger et al. | 123/478 |
| 4,653,453 | 3/1987 | Kamai et al. | 123/444 |
| 4,703,649 | 11/1987 | Eitoku et al. | 73/118.1 |
| 4,703,823 | 11/1987 | Yogo et al. | 180/197 |
| 4,706,062 | 11/1987 | Männle et al. | 338/172 |
| 4,722,313 | 2/1988 | Kohler et al. | 123/494 |
| 4,883,037 | 11/1989 | Mabee et al. | 123/399 |
| 4,915,075 | 4/1990 | Brown | 123/399 |
| 4,933,661 | 6/1990 | Oda et al. | 338/174 |
| 4,944,269 | 7/1990 | Imoehl | 123/399 |
| 4,958,607 | 9/1990 | Lundberg | 123/399 |
| 4,983,946 | 1/1991 | Kotaki et al. | 338/200 |
| 5,133,321 | 7/1992 | Hering et al. | 123/399 |
| 5,307,776 | 5/1994 | Unuvar et al. | 123/399 |
| 5,327,865 | 7/1994 | Reihemann | 123/397 |
| 5,339,782 | 8/1994 | Golzer et al. | 123/399 |

OTHER PUBLICATIONS

H. Collona, "VDO 'Electric Accerlerator' Remote Control", distributed at the Second Int'l Conference on Automotive Electronics, London, England held Oct. 29–Nov. 2, 1979.

Primary Examiner—Raymond A. Nelli
Attorney, Agent, or Firm—Watts, Hoffmann, Fisher & Heinke

[57] ABSTRACT

An engine control system is disclosed having a unit for providing signals indicative of the position of an engine throttle member. The unit comprises a housing assembly associated with an engine throttle member and containing a stator assembly and a rotor assembly. The rotor assembly moves relative to the stator assembly as the throttle member moves. The rotor and stator assemblies are electrically coupled together for producing first and second continuously variable, ratiometrically identical signals whose values depend upon the throttle member position. The first signal is delivered from the housing assembly for use in controlling the engine operation. Processing circuitry processes the second signal for producing a throttle position validation signal having a first value when the throttle member is in an engine idle range of positions and a second value when the throttle member moves beyond the idle range of positions. If the first signal and the validation signal signify incompatible throttle member positions the engine speed is limited to "idle."

12 Claims, 11 Drawing Sheets

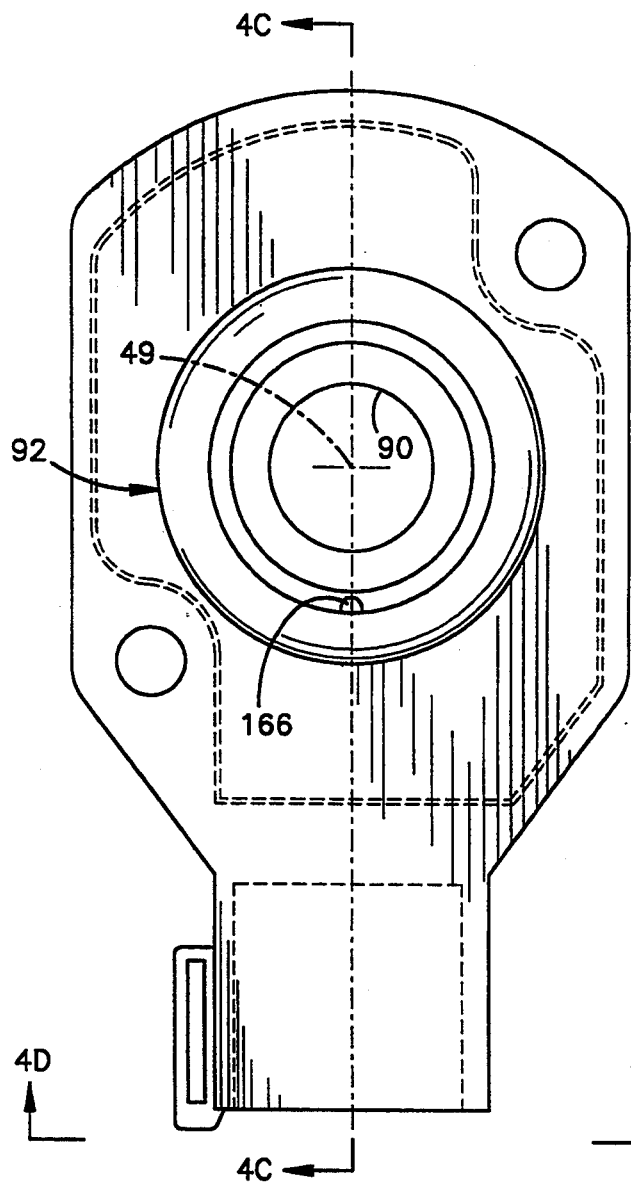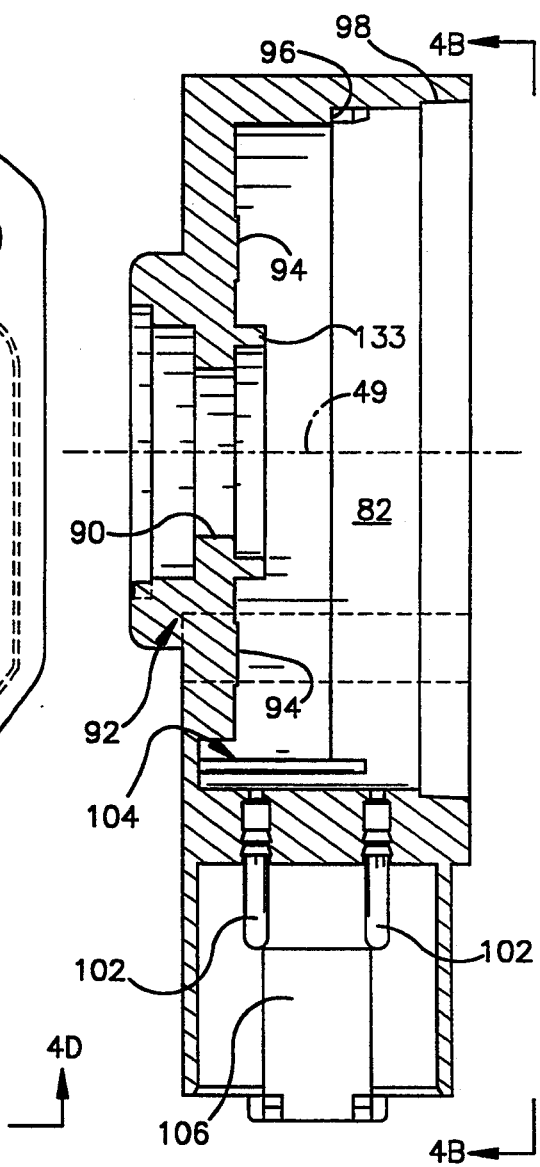
Fig.4A          Fig.4C
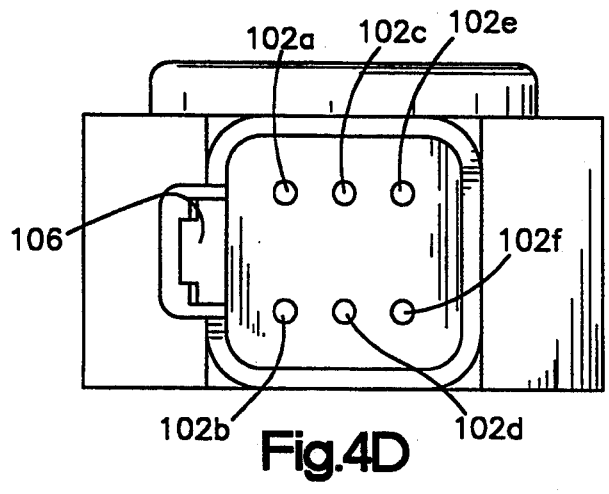
Fig.4D

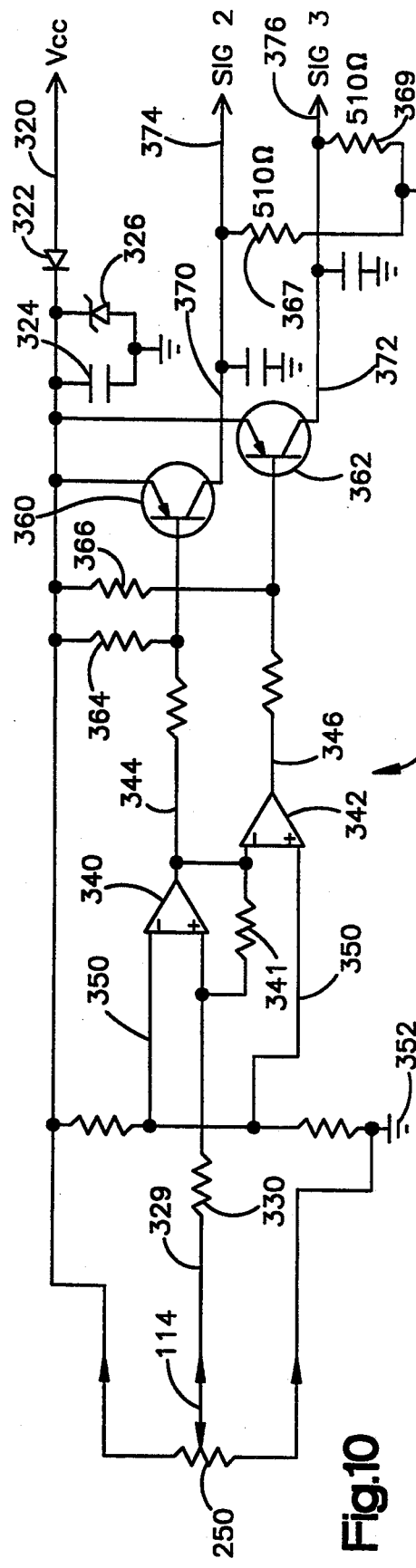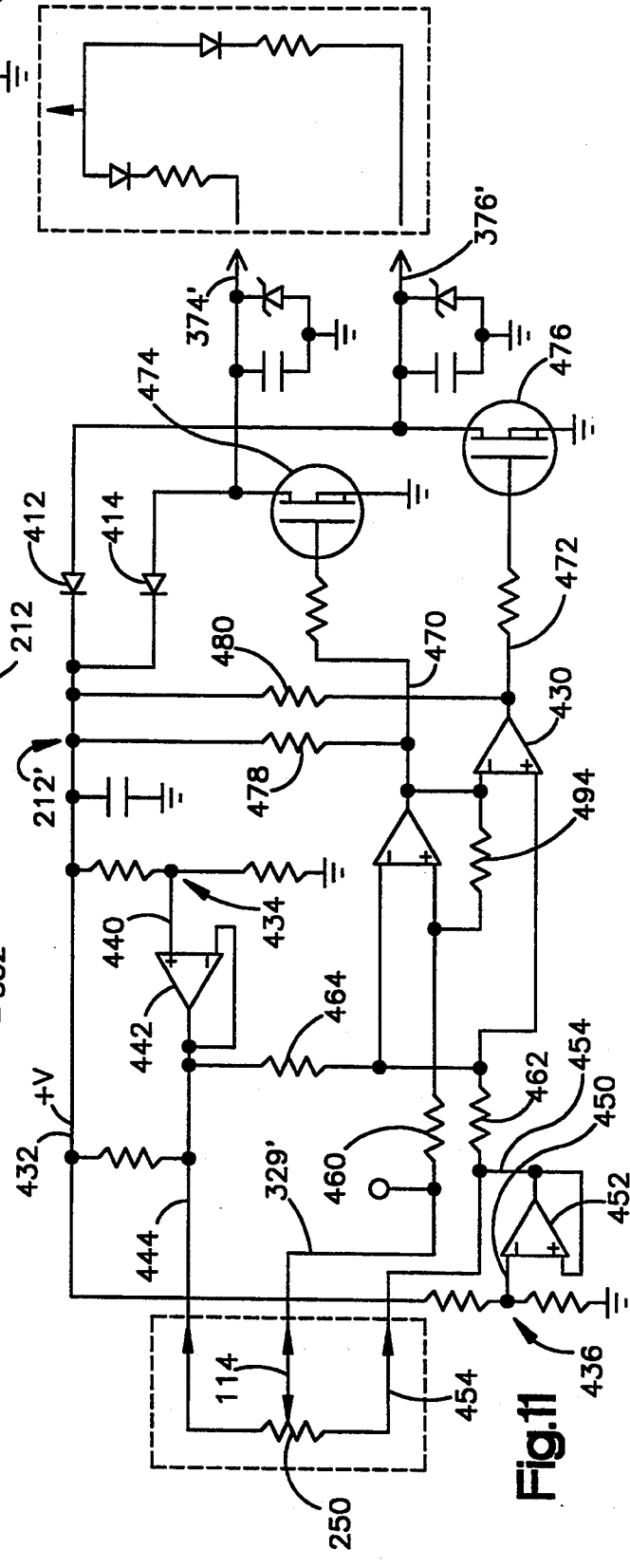

THROTTLE POSITION VALIDATION METHOD AND APPARATUS

FIELD OF THE INVENTION

The present invention concerns a throttle pedal position sensor for a motor vehicle and, more particularly, a throttle pedal position sensor that provides complementary signals for validating throttle positioning.

BACKGROUND ART

In prior art motor vehicle designs, engine setting has been achieved by a mechanical linkage between a throttle control element, such as a foot pedal, and a butterfly valve which opens and closes to adjust the amount of combustion air entering the engine intake manifold. With the increasing use of fuel injection, many vehicles employ electronic controls to adjust the amount of fuel reaching the engine combustion chambers. Proposals have been made to directly convert throttle pedal position to an electric signal which controls fuel injection. Such vehicles may not employ any direct mechanical linkage between the throttle pedal and the engine. Instead, the fuel flowing to the engine is controlled by an electric signal whose value varies according to throttle pedal position. In case of a failure in the electronics resulting in false output signals, the vehicle engine speed could become uncontrollable by the operator.

In order to assure safe operation of such vehicles, engine idle validation devices have been employed. When the engine throttle pedal is in its "engine idle" position (e.g. when an operator's foot is off the pedal), an output signal is produced signifying that the pedal is not depressed. When the pedal is depressed beyond a predetermined "idle" position, the validation device signals that the pedal is away from the idle position. Engine operation in response to the pedal position is then enabled.

Idle validation devices have sometimes taken the form of mechanical on-off type switches actuated by the throttle pedal separately from the throttle position signal generator. The mechanical switches had to be installed and calibrated so that they accurately signalled the pedal position. In use, these switches were subject to mechanical forces which shifted them relative to the pedal and to the pedal position signal generator. Besides requiring recalibration, shifting switch settings relative to the pedal position signal generators could disable the vehicle. Moreover, the mechanical switches exhibited fixed relatively wide hysteresis which was undesirable. An example of a prior art proposal of an idle validation device for use with an electronic fuel injection control is disclosed in U.S. Pat. No. 5,133,321 to Hering et al. The Hering et al. patent provided an idle verification device which was fixed in a housing with a pedal position signal generator so that calibration settings could not drift relative to each other. The idle verification switch was provided by a deposited resistance material similar to the deposited material used to form the signal generator. The deposited material forming the idle verification switch was interrupted so that when the pedal was in its idle position one section of the material was engaged by a conductive wiper arm to signal the pedal position at idle. The other section of the material was engaged to signal the pedal position away from idle.

This approach required that the resistance material sections be spaced apart, creating a "dead band" in which the conductive wiper arm engaged neither section of the deposited material. No output of any sort was available from the verification switch in the dead band, which is undesirable. The dead band simulated hysteresis so that the pedal position could be varied somewhat without generating frequent incompatible verification signals.

The present invention provides a new and improved throttle pedal position signalling unit. Wherein independently derived signals both indicate pedal position and validate the pedal position without requiring calibration or periodic adjustments for recalibration.

DISCLOSURE OF THE INVENTION

An engine control system is disclosed having a unit for providing signals indicative of the position of an engine throttle member. The unit comprises a housing assembly associated with an engine throttle member and defining a chamber for a rotor assembly and a rotor assembly. The stator assembly is fixed against movement with respect to the housing and the stator assembly is connected to the throttle member for movement relative to the stator assembly in relation to throttle movement. The rotor and stator assemblies are electrically coupled together for producing first and second continuously variable, ratiometrically identical signals whose values depend upon the throttle member position. The first signal is delivered from the housing assembly for use in controlling the engine operation. Processing circuitry processes the second signal for producing a throttle position validation signal having a first value when the throttle member is in an engine idle range of positions. The processing circuitry produces a validation signal having a second value when the throttle member moves beyond the idle range of positions. If the first signal and the validation signal signify incompatible throttle member positions the engine speed is limited to "idle."

BRIEF DESCRIPTION OF THE DRAWINGS

FIG. 4A is an elevation view of a housing forming part of the unit of FIG. 3;

FIG. 4C is a view seen approximately from the plane indicated by the line 4C—4C of FIG. 4A;

FIG. 4D is a view seen approximately from the plane indicated by the line 4D—4D of FIG. 4A;

FIG. 10 is a schematic diagram of a circuit for generating complementary pedal position validation signals;

FIG. 11 is a schematic diagram of a portion of an alternate circuit for generating complementary pedal position validation signals.

BEST MODE FOR PRACTICING THE INVENTION

Figure 1:
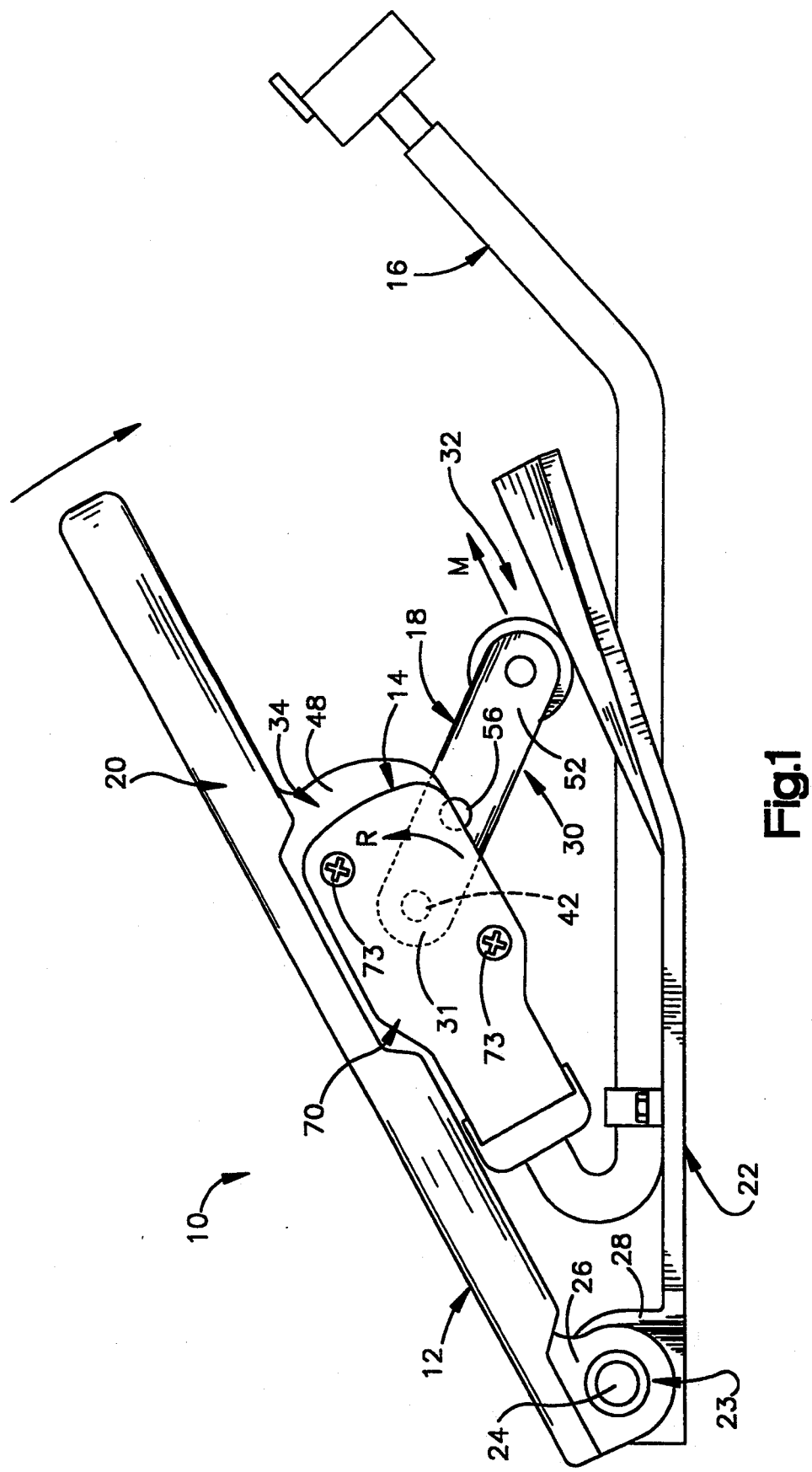
FIG. 1 is a side elevation view of a vehicle throttle pedal assembly embodying the present invention attached thereto.
Figure 2:
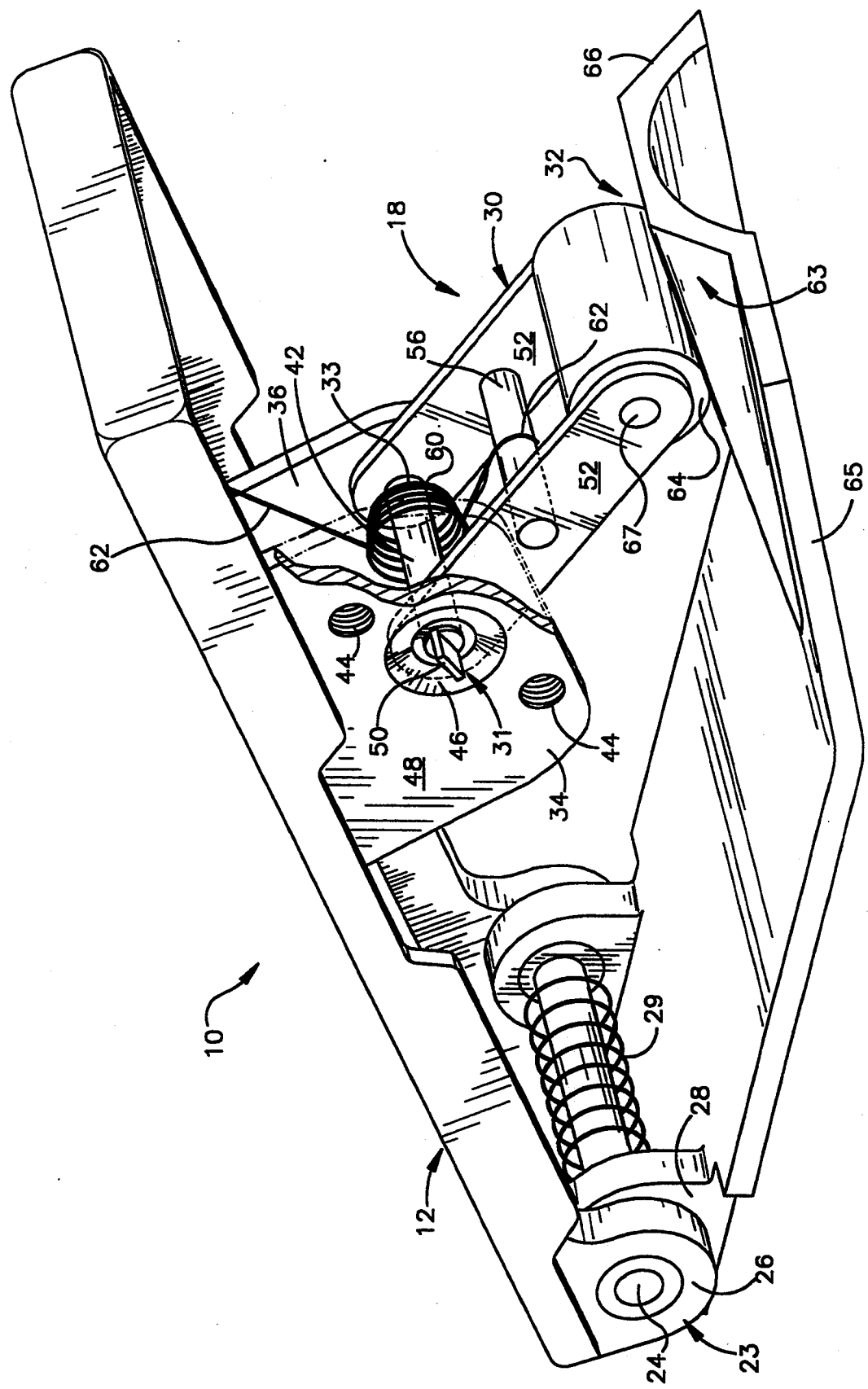
FIG. 2 is a perspective view of the assembly of FIG. 1 with parts removed.

FIGS. 1 and 2 of the drawings illustrate a position signalling throttle pedal assembly 10 embodying the present invention which is constructed for use in controlling automotive vehicle engines. The assembly 10 comprises a throttle pedal unit 12 actuated by a vehicle operator to control the engine, a pedal position signal generating unit 14 (FIG. 1) producing electric signals indicative of pedal position, a signal cable 16 for transmitting the signals to an engine controller (not illustrated), and a linkage 18 for actuating the signal generator 14 in response to pedal positioning.

The assembly 10 is constructed to simulate the operation of a throttle controlling pedal which is mechanically linked to the engine. Thus when the operator's foot is off the pedal (as illustrated in FIG. 1) the engine "idles." As the pedal is depressed, a continuously variable throttle position signal is produced by the unit 14 and transmitted to the engine controller so that progressively more fuel and air are supplied to the engine. Because there is no mechanical linkage between the operator and the engine, it is important to insure against a malfunction of some sort creating spurious electrical signals which cause the engine to operate out of control. The new assembly 10 also produces throttle position validation signals which are also transmitted to the engine controller.

FIGS. 1 and 2 illustrate the pedal unit 12 as comprising a pedal 20, a pedal supporting base plate 22 and a hinge assembly 23 connecting the pedal to the base plate. The base plate 22 is formed of heavy gage sheet metal and secured to the vehicle operator's compartment floor by suitable connectors (not illustrated). The pedal 20 coacts with the hinge assembly and base plate to simulate a conventional pedal mechanically linked to a carburetor or fuel injection system. The pedal is schematically illustrated as constructed from heavy gage sheet metal and may have a rubber-like tread member (not shown) bonded to its upper side for traction and wear resistance. The lower, pedal base end is coupled to the base plate 22 by the hinge assembly 23 so that the upper pedal tip end moves toward and away from the base plate through an arc.

The hinge assembly 23 secures the pedal to the base plate and locates the pedal in its "engine idle" position when the operator's foot is either off the pedal or exerting less than a predetermined force. The hinge assembly 23 comprises a hinge pin 24, pin receiving pillow blocks 26, 28 formed on the pedal and base plate, respectively, and a pedal return spring 29 (FIG. 2). The pillow blocks comprise ear-like projections in which aligned bearings are fixed. The bearings receive the pin 24 to assure a stable, wear resistant, low friction interconnection between the pedal and base plate.

The return spring 29 reacts between the pedal and the base plate to strongly resist depression of the pedal by the operator and to return the pedal to its idle position when the operator's foot is relaxed or removed from the pedal. The preferred spring 29 is a helical torsion spring surrounding the pin 24. Opposite spring ends react between the pedal and base plate, respectively, to bias the pedal.

The linkage 18 reacts between the pedal 20 and the base plate 22 to condition the signal generating unit 14 for signalling the exact pedal position relative to the base plate. The linkage 18 comprises a lever assembly 30 extending between the pedal and the base plate, a pivot unit 31 connecting the lever assembly to the pedal, a cam mechanism 32 for positioning the lever assembly relative to the pedal and a return spring 33 biasing the lever assembly 30 to its engine idle position.

As can best be seen in FIG. 2 the pivot unit 31 comprises a flange 34 and lug 36 extending from the pedal 20 and containing bearings (not illustrated) and a pivot shaft 42 mounted in the bearings for rotation relative to the pedal. The flange 34 carries the signal generating unit 14 on its front face 48 and includes tapped mounting holes 44 and a circular locating recess 46 on the front face 48. The holes 44 and recess 46 assure accurate alignment of the signal generating unit 14 with the pedal 20.

The shaft 42 transmits motion from the linkage 18 to the signal generating unit 14. The shaft 42 is mounted for low friction rotation in the aligned flange and lug bearings and is fixed to the lever assembly 30. Thus the shaft 42 rotates relative to the flange 34 about an axis 49 when the pedal moves relative to the base plate. The shaft 42 is preferably cylindrical with a tang 50 at one end projecting outwardly beyond the flange face 48 for engagement with the signal generating unit 14.

The lever assembly 30 drives the shaft 42 for actuating the signal generating unit 14. The lever assembly 30 extends between the shaft 42 and the cam mechanism 32 so that as the pedal 20 moves, the cam mechanism 32 and lever assembly 30 control the degree of shaft rotation. The lever assembly 32 comprises a pair of lever members 52 fixed to the shaft 42 and projecting to the cam mechanism 32 at the base plate, a cross member 56 fixed between the lever members and spaced from the shaft, and a return spring 60 (FIG. 2) for biasing the lever members towards their "engine idle" position. The lever members 52 are fixed to the shaft 42 (for example by keys and keyways) at axially spaced locations adjacent the respective confronting sides of the flange 34 and lug 36. The lever members 52 extend parallel to each other toward the cam mechanism with the cross member 56 fixed between them for support. The return spring 60 (schematically shown) is a helical torsion spring encircling the shaft 42 with its opposite ends 62 resiliently engaging and reacting between the pedal 20 and the cross member 56. The spring 60 is coiled to strongly urge the lever members 52 clockwise about the shaft 42 axis 49 (as seen in FIGS. 1 and 2) toward the lever assembly "engine idle" position.

The cam mechanism 32 governs the degree of shaft (42) rotation created by a given pedal movement. The mechanism 32 comprises a cam ramp 63 on the base plate 22 and a roller follower 64 carried by the lever assembly 30. The cam ramp 63 is illustrated as formed by an upturned base plate end 65 having an embossed cam track 66 extending along its length. The cam follower 64 is formed by a cylindrical roller extending between the lever member ends remote from the shaft 42 and a roller axle 67. The axle 67 is fixed between the lever member ends and carries the roller which is freely rotatable on the axle. The illustrated roller follower 64 provides a wide cylindrical cam following surface which is matched by the wide flat embossed cam track surface on the base plate end 65. The illustrated cam track is formed by a straight, angled ramp on the base plate, but other ramp configurations can be employed to produce shaft rotations varying as desired functions of pedal displacement.

When the pedal 20 is in its "engine idle" position, the roller follower 64 is at an initial position on the cam ramp 63 which is illustrated by FIGS. 1 and 2. As the vehicle operator depresses the pedal 20 both the pedal 20 and the lever members 52 rotate. The pedal 20 rotates in opposition to the spring 29 (clockwise as viewed in FIG. 1) and the lever members 52 rotate in opposition to the spring 60 (counterclockwise as viewed in FIG. 1). The roller follower moves along the cam ramp in a direction "M" (see FIG. 1) and the levers 52 rotate the shaft 42 in the direction of the arrow "R."

When the pedal pressure is relieved, the return spring 60 urges the lever members back toward their initial "engine idle" positions, while the spring 29 returns the pedal to its "engine idle" position. The shaft 42 then turns in the direction opposite to the direction of the arrow "R" (FIG. 1).

The signal generating unit 14 of the present invention is carried by the pedal 20 for providing electric pedal position responsive signals to control the engine. The unit 14 (FIGS. 1 and 3) comprises a housing assembly 70, a signal handling stator assembly 71 anchored in the housing, and a rotor assembly 72 movably supported in the housing and coacting with the stator assembly 71 for generating pedal position responsive signals. The rotor and stator assemblies are disposed in a sealed chamber defined by the housing assembly. The housing assembly 70 is secured to the pedal 20 with the rotor assembly 72 connected to and driven by the shaft 42 for rotation relative to the stator assembly 71. Position signals are generated as the rotor assembly moves relative to the stator assembly. In the preferred construction the housing assembly is clamped to the pedal by screws 73 (FIG. 1) extending through openings in the housing assembly which are aligned with the tapped mounting flange holes 44.

Referring to FIGS. 3 and 4A-C, the housing assembly 70 comprises a cup-like housing member 74 receiving the stator and rotor assemblies, a cover member 76 for the housing member, a terminal connector arrangement 78 and an assembly spring member 80 associated with the cover member for maintaining the stator assembly in position.

The housing member 74 is a relatively high strength, electric insulator molded from plastic or plastic-like material (for example Valox 420). The member 74 forms a cavity 82 defined by a base wall 84 and a surrounding side wall 86. The rotor and stator assemblies are received in the cavity 82 and are accurately positioned with respect to each.

The base wall 84 supports the rotor assembly 72 in a rotor assembly supporting boss structure 92. The boss structure defines a bore 90 aligned with the shaft axis 49 for accurately positioning and securing the rotor assembly radially with respect to the shaft axis. Arcuately curved bearing lands 94 are formed in the base wall 84 adjacent the boss structure 92 for engaging and locating the rotor assembly relative to the shaft axis. The lands 94 project slightly from the wall 84 towards the rotor and define narrow, low friction bearing faces engaged with the rotor assembly.

The stator assembly 71 is fixed against movement both axially and radially relative to the housing assembly. The side wall 86 defines a seat forming shoulder 96 extending partially about the irregularly shaped cavity (82) perimeter at a given distance from the base wall 84 bearing land faces. The stator assembly 71 firmly seats on the shoulder 96 to fix the axial location of the stator assembly in the housing assembly. The stator assembly perimeter shape conforms to the shape of the cavity perimeter and shoulder 96 so that the stator assembly is fixed against any radial or circumferential motion relative to the housing member when seated on the shoulder 96.

Figure 3:
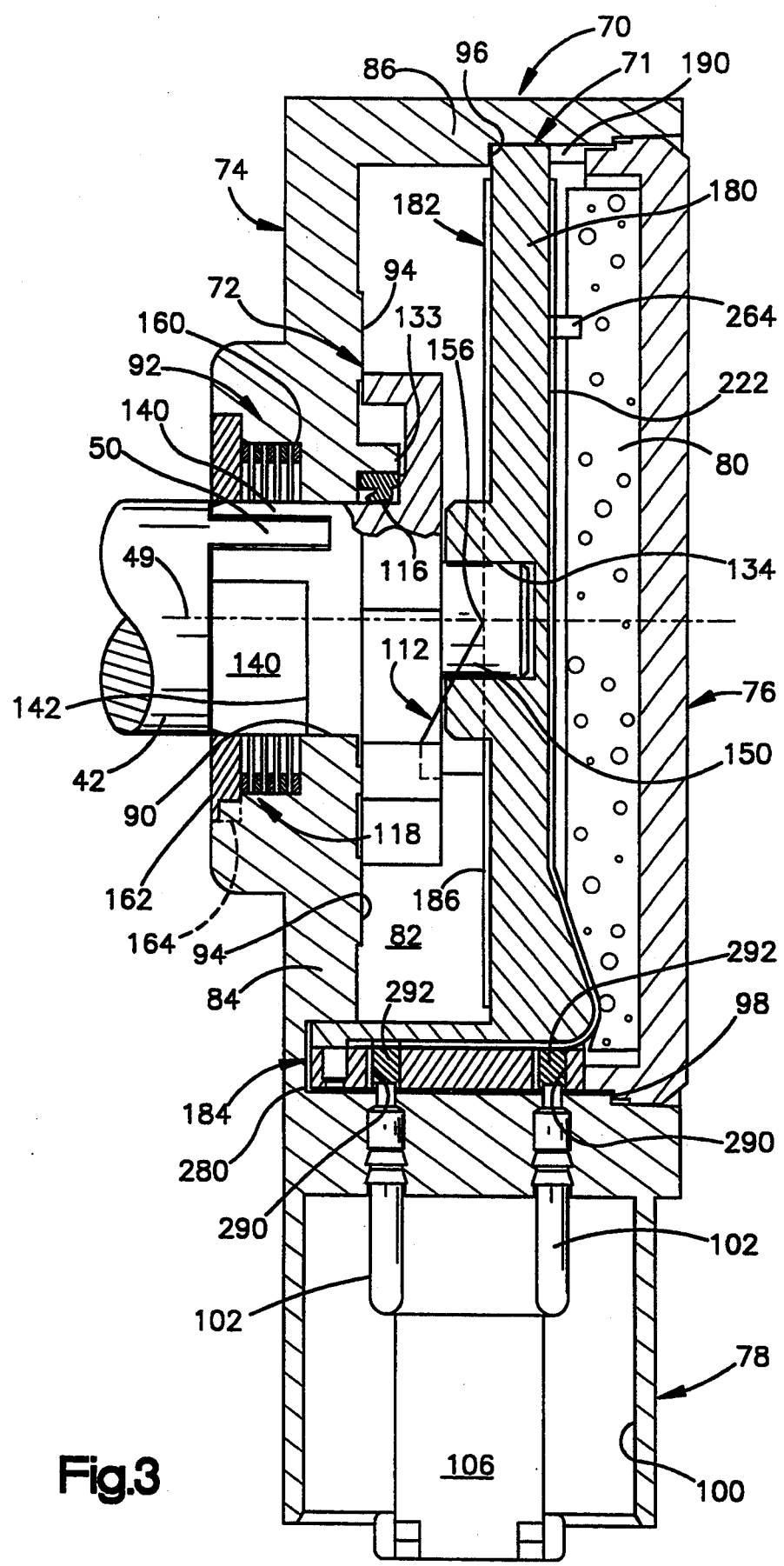
FIG. 3 is a cross sectional view of a pedal position signal generating unit forming part of the assembly of FIGS. 1 and 2.
Figure 4B:
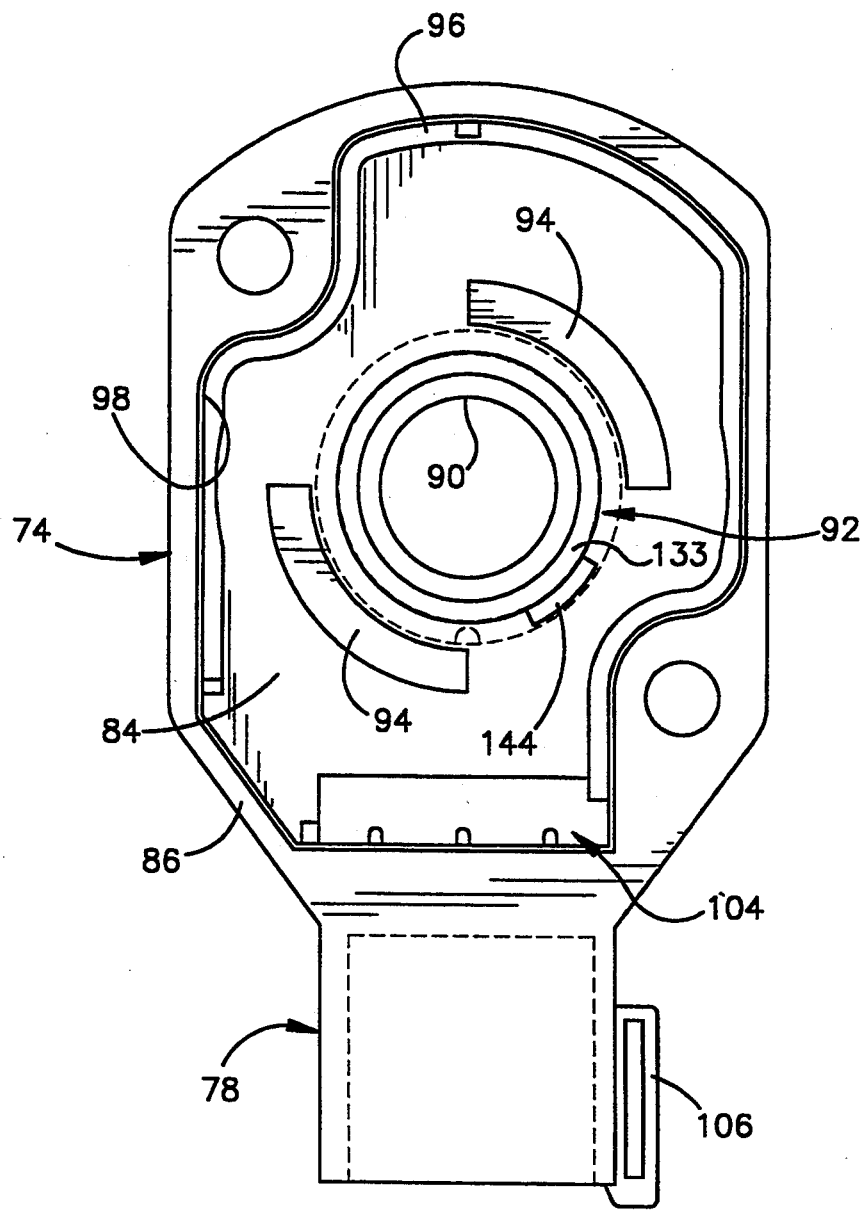
FIG. 4B is a view seen approximately from the plane indicated by the line 4B—4B of FIG. 4C.

The cover member 76 (FIG. 3) both closes the cavity 82 and resiliently clamps the assembly spring member 80 against the stator assembly. The cover member 76 is a flat plate-like member hermetically secured to the housing member 74 at the cavity end remote from the base wall 84 to close the housing assembly chamber. As shown by FIG. 3 the housing side wall 86 defines a cover member seating shoulder 98 disposed a fixed distance from the shoulder 96 near the cavity open end. The cover member 76 is bonded to the shoulder 98 (for example by ultrasonic welding) when the housing assembly is complete. The shoulder perimeter conforms to the cavity perimeter shape and to the perimetral cover member (76) shape to assure a complete and hermetic bond.

The illustrated spring member 80 is formed by a pad of foam plastic or rubber-like material compressed between the cover member and the stator assembly 71. The spring member periphery conforms generally to the cavity shape and thus overlies the stator assembly. The uncompressed pad thickness is appreciably greater than the distance between the cover member and the stator assembly so that the pad resiliently maintains contact with the stator assembly. In addition to its spring function the foam construction cushions the housing assembly against road shocks. Other forms of assembly spring can be employed.

The terminal connector arrangement 78 detachably couples the signal cable 16 to pedal position signal circuitry of the stator assembly. In a preferred embodiment of the invention the cable 16 plugs into the signal generating unit 14. The illustrated terminal connector arrangement 78 (FIGS. 3 and 4A-C) comprises a female socket formation 100 continuous with and projecting from an external face of the side wall 86, a series of terminal pins 102a-f hermetically fixed in and extending through the side wall 86 into the cavity 82 for electrical engagement with respective stator assembly circuit elements, and guide structure 104 along the internal face of the side wall 86 for assuring proper alignment between the terminal pins and the stator assembly.

The socket formation 100 extends about the terminal pins 102 and the mating male end of the cable 16 to shield their juncture. A guide slot 106 integral with the socket formation 100 interfits with a key formed on the cable plug (not illustrated) to assure the terminal pins are properly aligned with the cable plug. Each terminal pin 102 is press fit into a respective conforming preformed side wall (86) hole. Terminal pin ends project through the wall 86 into the cavity 82 for making good electrical contact with stator assembly circuit elements when the housing assembly has been completed.

Figure 5A:
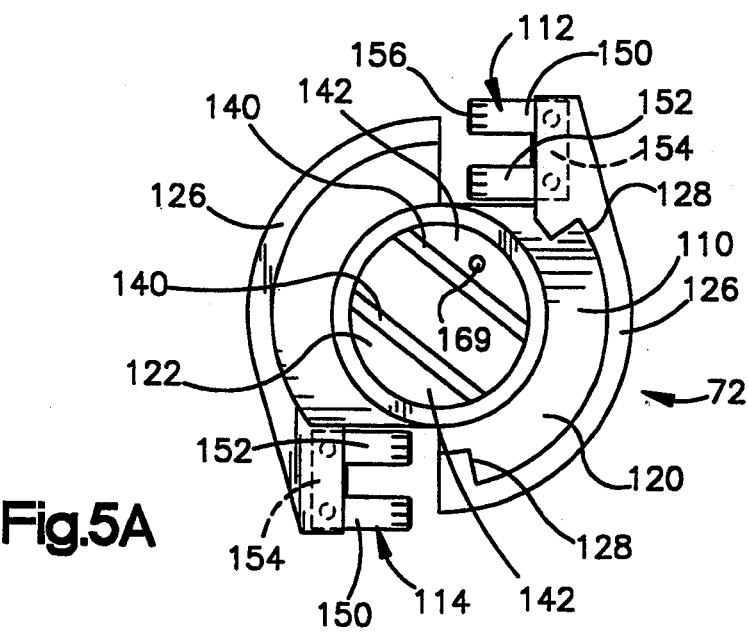
FIG. 5A is a top plan view of a rotor component of FIG. 3.

The rotor assembly 72 (See FIGS. 3 and 5) is mounted for rotation about the axis 49 between the boss structure 92 and the stator assembly 71 and coacts with the stator assembly to create electrical signals indicative of throttle pedal position. The rotor assembly 72 comprises a molded rotor body 110, position signal transmitting circuit elements 112, 114, coupled to the stator assembly, a shaft seal 116, and a return spring system 118.

The rotor body 110 carries the position signal transmitting circuit elements 112, 114 and rotates with the shaft to move the position signal transmitting elements relative to the stator assembly circuitry for producing the position signals. The rotor body comprises a disc-like rotor member 120, supporting trunnions 122, 124 projecting from opposite faces of the member 120 along the axis 49, bearing flanges 126 depending from the rotor member outer periphery for engagement with the bearing lands 94, and rotor body travel limiting stop elements 128 (See FIG. 5A).

The rotor member 120 is a relatively thin, planar member centered on the axis 49 and defining a pair of generally cylindrically curved outer peripheral sections 130 each having a wing-like projection 132 extending tangentially away from one end. The position signal transmitting elements 112, 114 are molded into respective projections 132. Each bearing flange 126 projects from a respective cylindrical rotor body periphery and defines a relatively narrow bearing face engagable with a bearing land 94. A generally circular channel is defined between the trunnion 124 and the bearing flanges 126 into which a cylindrical housing member boss element 133 surrounding the bore 90 extends (See FIGS. 3 and 4).

The trunnions 122, 124 are aligned on the axis 49 and support the rotor assembly for rotation about the axis 49. The trunnions are respectively received and supported for rotation in the housing member wall bore 90 and in a stator assembly bearing socket 134 (FIG. 3). The shaft seal 116 is a conventional resilient ring seal seated on a shoulder within the boss element 133 and having faces sealingly engaging the trunnion 122, the rotor member 120 and the shoulder so that the housing chamber is sealed against the ingress of moisture, dust, etc. along the trunnion 122. The end of the trunnion 122 projecting from the bore 90 is shaped to provide two parallel blade-like tangs 140 which receive the shaft tang 50 between them. The shaft 42 positively drives the rotor in both directions of rotation because of the relationship between the tangs. Planar semicircular shoulders 142 remain radially outwardly of the tangs 140.

The stop elements 128 coact with a stop lug 144 (FIG. 4B) formed on the boss element 133 to limit rotor body rotation. The elements 128 are defined by radially inwardly projecting faces on the bearing flange 126. The lug 144 is molded continuously with the boss element 133 and the base wall 84 and projects radially outwardly from the boss element. The faces are spaced apart a sufficient distance about the axis 49 to assure that the pedal 20 freely moves the rotor body through the full range of pedal travel. The stop elements limit rotor member motion if the rotor member should move beyond its normal operating range.

Figure 5B:
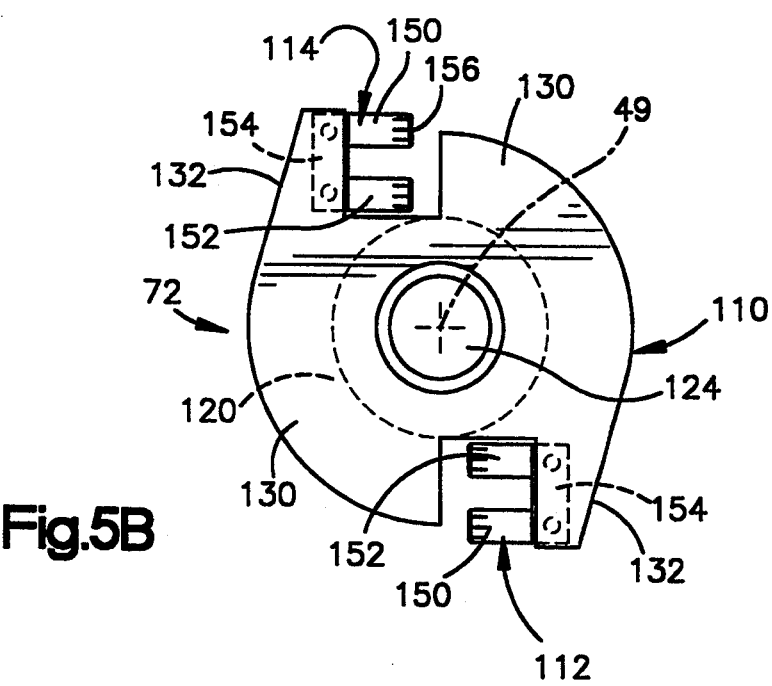
FIG. 5B is a bottom view of the rotor component of FIG. 5A.
Figure 6A:
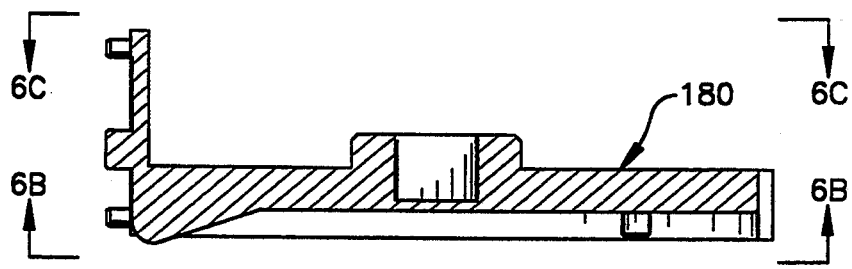
FIG. 6A is a cross-sectional view of a stator member illustrated in FIG. 3 and shown on a smaller scale.
Figure 6B:
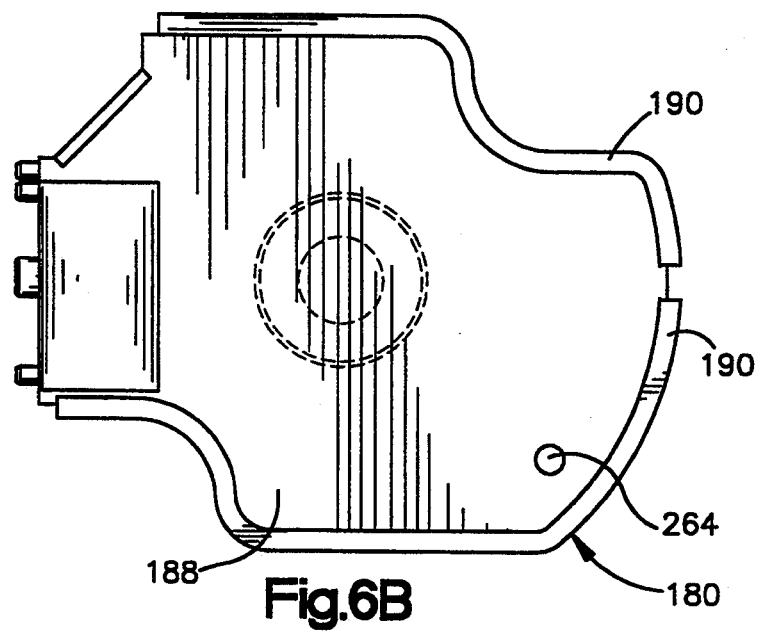
FIG. 6B is a view seen approximately from the plane indicated by the line 6B—6B of FIG. 6A.
Figure 6C:
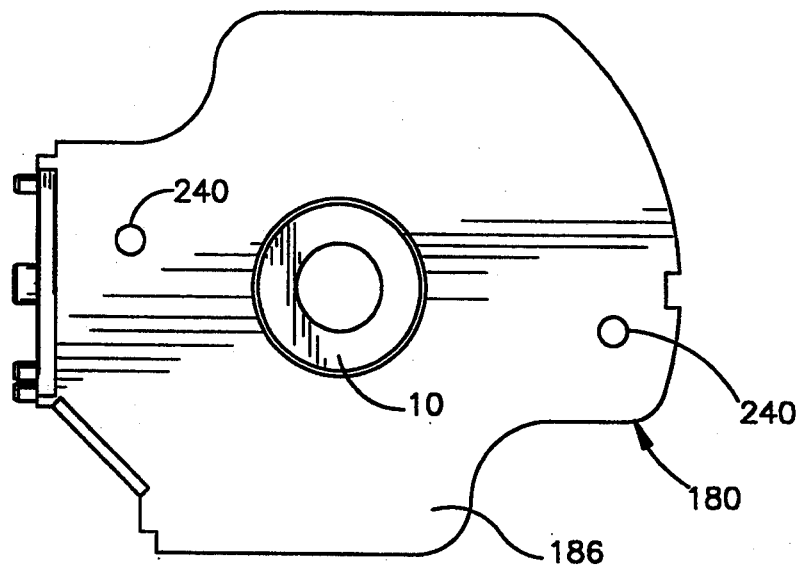
FIG. 6C is a view seen approximately from the plane indicated by the line 6C—6C of FIG. 6A.

The position signal transmitting elements 112, 114 are electrically coupled to conductive circuit elements on the stator assembly 71 to produce electrical signals whose values vary as a function of the rotor body position relative to the stator assembly 71. The illustrated position signal transmitting elements are potentiometer wiper elements each respectively engaging and bridging pairs of stator assembly circuit elements forming potentiometers (the stator assembly circuit elements are described in detail below). Referring to FIGS. 3 and 5, each wiper element is a thin, highly conductive beryllium copper sheet forming first and second resilient contact arms 150, 152 projecting from the rotor member for resilient engagement with the stator assembly and a bridge 154 extending between the arms. The bridge 154 is molded into the rotor member 120 with the arms projecting from the rotor member. Each arm terminates in a plurality of projecting, curved wiper fingers 156. The wiper fingers 156 engage electrical resistance material deposited on the stator assembly for producing position related electrical signals. The preferred fingers 156 have gold alloy tips.

The return spring system 118 (FIG. 3) reacts between the housing assembly and the rotor body 110 to bias the rotor body against movement away from its position corresponding to the "engine idle" throttle pedal position. The spring system 118 thus acts as a return spring in concert with the return springs 29 and 33. The system 118 additionally fulfills a failsafe role by assuring that the pedal position signal generating unit 14 produces engine idle signals should the shaft 42 and rotor assembly 72 ever be disconnected.

The illustrated spring system 118 comprises a helical torsion spring 160 disposed about the trunnion 122 between a shoulder forming part of the boss structure 92 and a washer-like spring anchor 162 surrounding the trunnion end projecting from the bore 90. The spring anchor 162 defines a peripheral notch 164 alignable with a radially inwardly extending key element 166 molded into the boss structure 92 (See FIG. 4A) for securing the spring anchor against rotation with respect to the housing assembly 70. A finger (not shown) formed at the spring end adjacent the anchor 162 projects through a receiving hole in the anchor so that the spring (160) end is fixed with respect to the housing assembly. The opposite end of the spring 160 is defined by a finger projecting into a receiving hole 169 (FIG. 5A) in the rotor member 120. The spring 160 is initially stressed by "winding" it about its axis so that when the rotor member is in the "engine idle" position the spring 160 forcefully retains the rotor member in place. As the rotor member moves away from the engine idle position the spring stress increases, strongly resisting the movement.

Figure 7A:
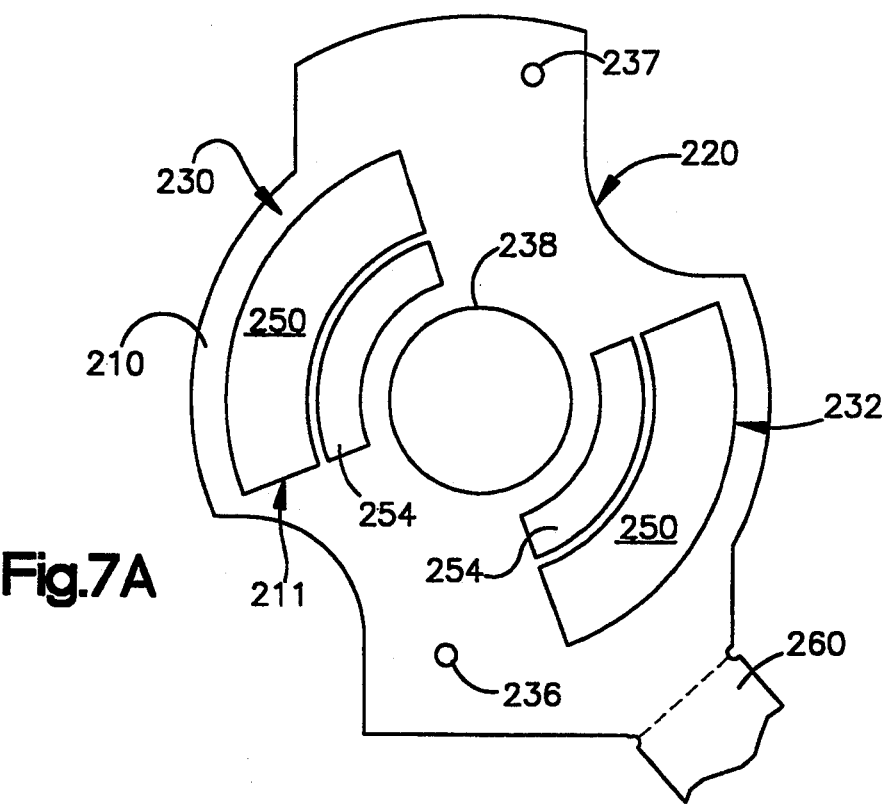
FIG. 7A is an elevational view of a film member having deposited resistance material tracks thereon.
Figure 7B:
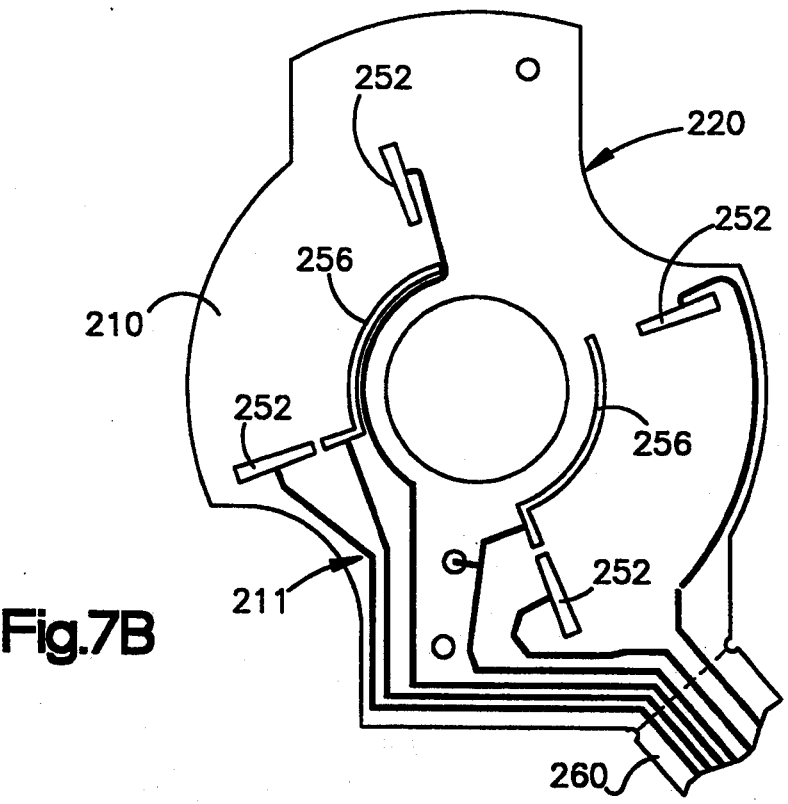
FIG. 7B is a view similar to FIG. 7A wherein the deposited materials are removed and printed electrical circuit elements exposed.
Figure 8:
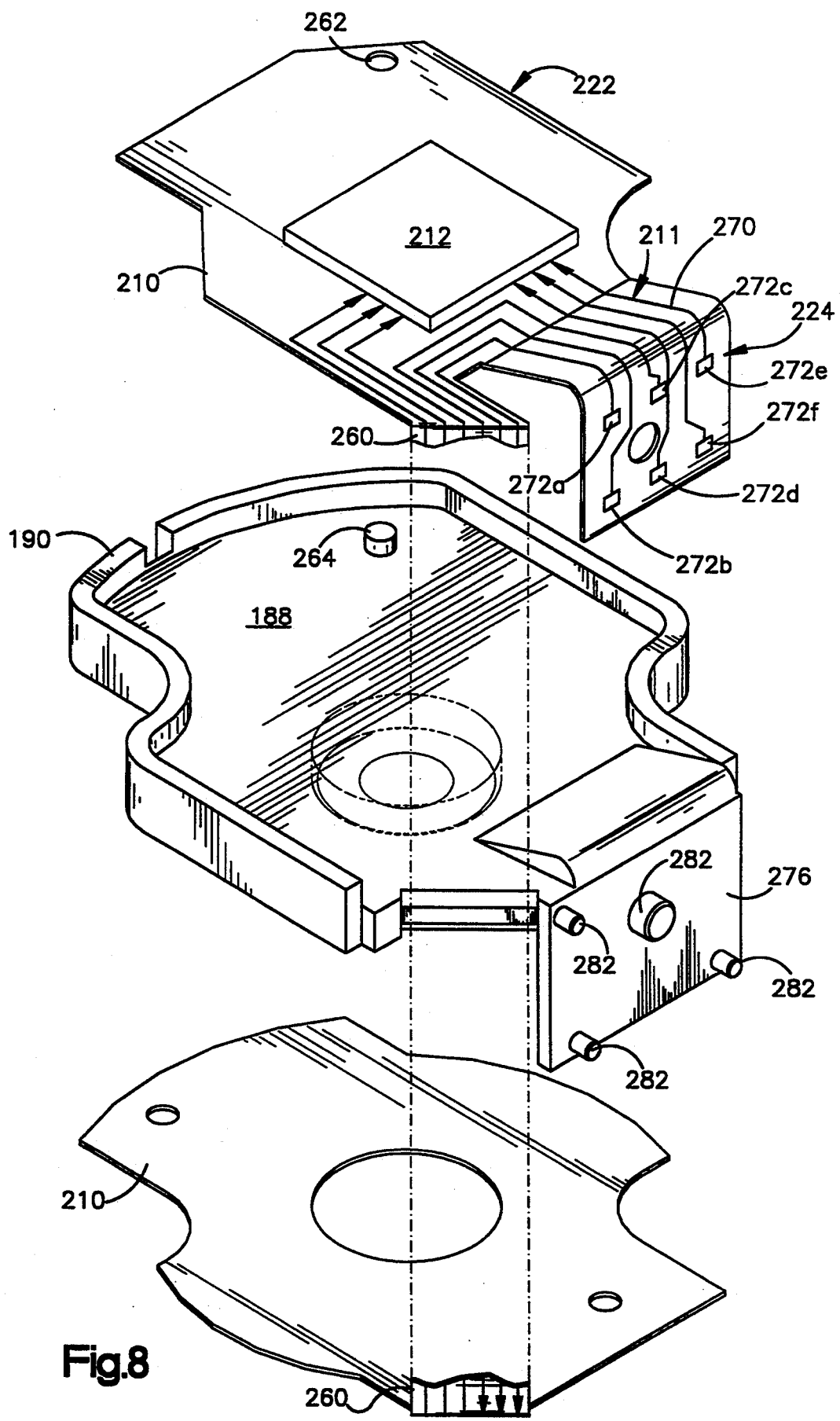
FIG. 8 is an exploded perspective view of the printed circuit film member of FIG. 7 and the stator member of FIG. 6.

The stator assembly 71 (FIGS. 3 and 6–8) is precisely stationed within the housing chamber for coaction with the rotor assembly 72 and the terminal connector arrangement 78 to produce and supply the position signals to the engine controller via the cable 16. The stator assembly comprises a stator body 180, a position signal assembly 182 (FIGS. 3, 7 and 8) supported by the body and an output signal terminal construction 184 for delivering signals from the assembly 182 to the cable 16.

The stator body 180 is fixed with respect to the rotor body 110. The preferred body 180 is a flat plate-like molded plastic member shaped to conform to the cavity 82 and having a face 186 confronting the rotor assembly and seated on the shoulder 96. The stator body defines a flange 190 extending partially about its periphery along the housing side wall 86 and projecting toward the cover member 76 to define a recessed body face 188 opposite the face 186. The cover member 76 is seated against the flange 190 to fix the stator assembly in place against the shoulder 96. A socket-like boss 192 projecting from the face 186 forms the socket 134 which receives and supports the trunnion 124 for rotation about the axis 49.

The position signal assembly 182 (see FIGS. 7 and 8) is precisely located on and fixed to the stator body for coacting with the rotor assembly to produce position signals and process and deliver them to the engine controller. The assembly 182 comprises a flexible nonconductive film member 210 anchored to the stator body, circuitry (generally indicated by the reference character 211) printed or otherwise deposited on the film member, and signal processing circuit components, schematically shown by FIGS. 3 and 8-10 and generally indicated by the reference character 212, mounted on the member 210 and connected to part of the circuitry 211 for processing pedal position signals.

The film member 210 comprises a position signal generating section 220 (FIG. 7) fixed to the stator body face 186, a signal processing circuit supporting section 222 (FIG. 8) fixed to the face 188 and a terminal section 224 (FIG. 8) associated with the terminal connector arrangement 78 to provide output signals from the unit 14.

The position signal generating section 220 is secured to the stator body face 186 in precise alignment with the stator and rotor bodies. The preferred signal generating section defines two pairs of deposited resistance material tracks 230, 232 (FIG. 7A) positioned for engagement by the respective wiper elements 112, 114, conductors printed in the film material for connecting the track pairs 230, 232 into the signal circuitry, and section alignment structure. The alignment structure comprises film member registration holes 236, 237, 238 which are respectively aligned with corresponding locating holes 240, 241 molded into the stator member and the boss 192. The holes 236, 240 and 237, 241 are aligned by assembly fixture pins extending through them when the boss 192 extends through the hole 238. The film member is bonded to the face 186 by a suitable adhesive applied between the face 186 and the film locations beneath the track pairs 230, 232. When the film member is secured in place the fixture pins are removed. In the preferred unit 14 each track pair 230, 232 is so constructed and arranged that it cooperates with its associated respective signal transmitting circuit element 112, 114 to form a potentiometer. Each track pair comprises a circularly curved resistor pad 250 extending between conductor pad segments 252 (FIG. 7B) at its opposite ends and an adjacent, concentric, radially aligned, circularly curved pad 254 of resistance material deposited on a conductor pad 256 which extends throughout the length of the pad 254. The wiper arms 150, 152 confront and contact the pads 250 and 254, respectively. The conductor pads 252, 256 form part of the printed circuitry on the film and are visible from the side of film opposite the resistor pads (see FIG. 7B).

Each pad 250 forms a voltage dropping resistive path between the associated conductor pad segments 252. When a given voltage is applied across the pad 250 via the pad segments 252 the voltage level existing at the contact point between the arm 150 and the pad 250 indicates the throttle pedal position. That voltage level constitutes a signal which is transmitted through the arm 150, bridge 154, arm 152, pad 254, the underlying conductor pad 256 and away from the signal generating section 220 via the printed circuitry. Since the conductor pad 256 extends the full length of the resistor pad 254 the voltage drop across the pads 254, 256 is constant regardless of the wiper arm position.

The track pairs 230, 232 are so constructed and arranged that, in cooperation with the elements 112, 114, the signal generated from the track pair 230 is ratiometrically identical to the signal generated from the track pair 232. In the preferred and illustrated embodiment of the invention the resistance pads 250 are identical and are displaced 180° from each other about the axis 49. The elements 112, 114 are likewise fixed to the rotor body so that the wiper fingers engage the pads 252 at locations spaced 180° apart. When the rotor body moves about the axis 49 relative to the stator body 180 the voltage signals produced from the track pairs 230, 232 are identical and vary as identical continuous functions of throttle pedal displacement.

The output signal from the track pairs 230, 232 are delivered to the signal processing circuit supporting section 222 via conductors printed on the film member 210. Voltage supply leads printed on the film member 210 likewise connect the conductor pads 254 associated with the track pairs 230, 232 to the section 222. The sections 220, 222 are attached to each other via a hinge-like bridge 260 of the film material on which the voltage signal and supply conductors are printed and which wraps around a side of the stator member 180.

The signal processing circuit supporting section 222 (FIGS. 3 and 8) is aligned with and bonded or otherwise adhered to the stator face 188. The section 222 defines a locating hole 262 receiving an alignment pin 264 projecting from the face 188. The signal processing circuit elements project away from the face 188. The flange 190 projects from the level of the face 188 slightly beyond the signal processing circuit (212) elements. The elements are lightly engaged by the assembly spring pad 80. The voltage signal input to the signal processing circuitry 212 is processed in a manner described presently and output signals from the processing circuitry are delivered to the film member terminal section 224.

The film member sections 222 and 224 are connected by a hinge-like bridge 270 which flexes to enable assembly of the sections 222, 224 to the stator body. The bridge 270 carries printed conductors extending between the terminal section 222 and the sections 220, 224.

The terminal section 224 is secured to and forms part of the terminal construction 184 with the printed conductors forming terminal pads 272a-f each electrically connected to a respective terminal pin 102a-f. The terminal construction 184 comprises a stator body flange 276 (FIG. 8) projecting from the plane of the face 186 and along the side wall 86 in the guide structure 104 and a retainer plate 280 (FIG. 3) for clamping the terminal section 224 in place for making electrical connections with the terminal pins.

The stator body flange 276 is molded integrally with the stator body 180. The flange 276 extends at a right angle with respect to the face 186. Locating pins 282 project from the body flange toward the side wall 86 for aligning the retainer plate and the film member terminal section 224 with the flange.

The retainer plate 280 aligns the film member terminal section 224 with the terminal pins while providing for electrical contact between the terminal pins and the terminal pads 272. The illustrated retainer plate is a rectangular molded plastic member having holes for receiving the alignment pins 282, parallel slots 290 (FIG. 3) aligned with and disposed between the terminal pads and the terminal pins, and elastomeric electrical connectors 292 supported in the slots and engaged with the pads 272 and pins 282.

Terminal construction assembly is completed by flexing the film member terminal section 224 into face contact with the body flange 276 and fitting a central alignment pin 282 through a conforming hole in the section 224; pressing the retainer plate onto the pins 282 and into clamping engagement with the film section 224; and positioning the stator assembly 71 in the cavity 82 with the flange 276 and retainer plate in the guide structure 104. The terminal pins 102a-f extend into resilient engagement with the connectors 292 which in turn are resiliently urged into engagement with the pads 272. The connectors 292 are each formed from an elongated rectangular body of resilient rubber-like electrical insulating material containing encapsulated strips of electrically conductive material (such as silver foil) extending parallel to each other between opposite faces of the connector from the terminal pads 272 to the terminal pins 102. The conductive strips are insulated from each other by the connector body material so that the only conduction taking place through the connector occurs directly between each terminal pad 272a-f and the associated one of the connector pins 102a-f.

Figure 12A:
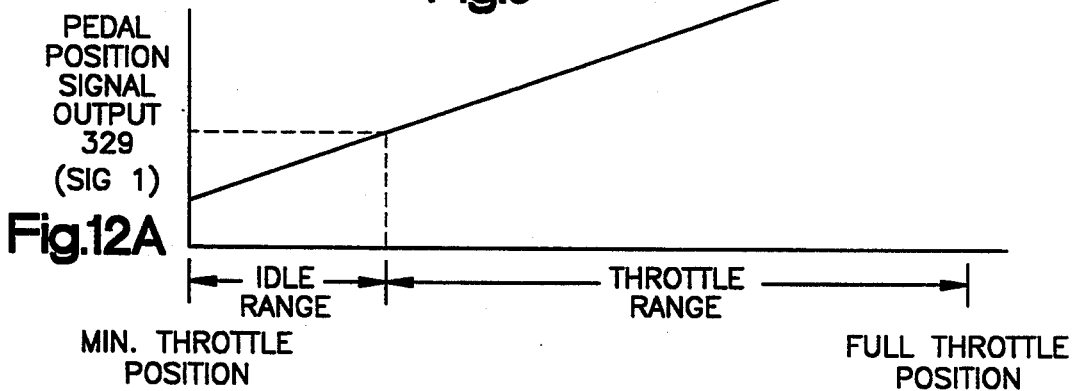
FIGS. 12A–12C are plots of signals produced by the circuitry of FIGS. 10 and 11.

The output signal from the track pair is directly output to the engine controller via the cable 16. This output signal (identical to the signal indicated by the reference character 329 of FIG. 12A) is an analog continuously variable signal corresponding to throttle pedal position. The output signal from the track pair 232 is identical and is indicated by the reference character 329 of FIG. 12A. The signal 329 is fed to the signal processing circuity 212 to produce complementary, logic output signals used by the engine controller to validate the output signal from the track pair 230. The logic output signals are graphically depicted by FIGS. 12B and 12C.

Figure 9:
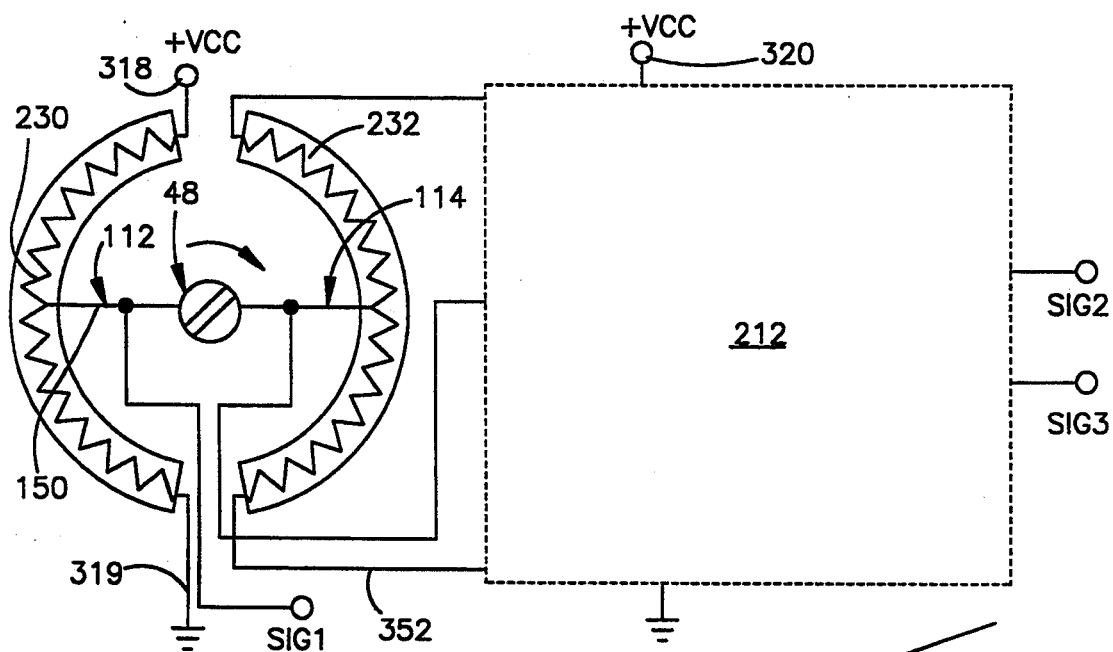
FIG. 9 is a schematic diagram of circuitry for generating throttle pedal position signals and complementary position validation signals constructed according to the invention.

FIG. 9 is a schematic diagram of the circuitry 211 and the signal processing circuitry 212. The DC power input 318 is electrically coupled to the conductive film element 250 of the track pair 230 which, in turn, is coupled to a grounding member 319. The wiper arm 150 acts as a voltage divider for the voltage drop across the film element 250. This pedal position signal, taken off the wiper arm 150, is input to the engine electronic control module.

A second DC power input 320 is electrically coupled to the conductive film element 250 of the track pair 232 and which, in turn, is coupled to a grounding member 352. The wiper arm 150 of the element 114 functions as a voltage divider for the voltage drop across the film element 250. The position of the wiper arm 150 along the film element 250 is dependent upon the position of the throttle pedal 20. The signal 329, is taken off the wiper arm 150 and input to the circuit 212 as will be described in detail with regard to FIGS. 10 and 11. The idle validation circuitry 212 generates the complementary signals 374, 376 (Sig 2 and Sig 3 of FIGS. 12B and 12C) which are input to the engine electronic control module.

Turning to FIG. 10, the idle validation signal generation circuit 212 includes the power input 320 coupled to the film element 250 through a diode 322 which protects the circuit 212 against reverse polarity connection of the power input. Noise suppression and voltage limiting is performed by the combination of a capacitor 324 and zener diode 326 which are also connected to the input 320. A typical voltage at the input 320 is plus five volts DC.

The 5 volt input 320 is applied across the film element 250 and a voltage output from the wiper arm 150 is coupled through a resistor 330 and connected to a non-inverting input (+) to a comparator 340. The signal 329 and the non-inverting input varies with the position of the throttle pedal 20 so that when the pedal is in the idle range, a particular voltage will be output through the wiper arm 150. The signal at the non-inverting input to the comparator amplifier 340, is also connected through a resistor 341 to an inverting input (−) to a second comparator 342.

Each of the two comparators 340, 342 includes a reference input 350 that defines a switching point for outputs 344, 346 from the comparators 340, 342. The reference input 350 is connected to an inverting input of the comparator 340 and is derived from a voltage divider coupled across the power input 320 and a ground connection 352. In the disclosed embodiment of the invention, this reference input 350 is held at a voltage of approximately one volt. Since the disclosed embodiment of the present invention is for monitoring an idle transition point for a throttle actuator, this value corresponds to the signal output 329 from the wiper arm 150 when the idle-non-idle threshold position is reached during depression of the pedal 20. The same voltage is applied to the non-inverting input of the second comparator amplifier 342.

The output signals 344, 346 are complementary and are coupled to base inputs of two switching transistors 360, 362. The base inputs to these switching transistors 360, 362 are biased by two pull-up resistors 364, 366 to maintain the transistors in an OFF condition. When one of the outputs 344, 346 goes low, the associated transistor is biased into conduction and pulls an associated output at the transistor's collector high. As an example, when the switching transistor 360 is biased into conduction by a low signal at the output 344, the transistor's collector 370 which is connected to ground through a resistor 367, is pulled high. In a similar fashion, a collector 372 is also connected to ground through a resistor 369. The transistor 362 responds to outputs from the comparator 342 on the output 346. Two complementary outputs 374, 376 (Sig 2 and Sig 3) are connected through terminal pins 272e, 272f, and the cable 16 to the engine electronic control module to validate the throttle pedal position output signal.

Figure 12B:
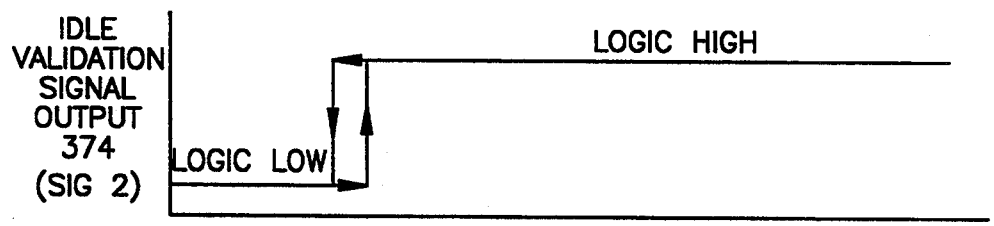
Figure 12C:
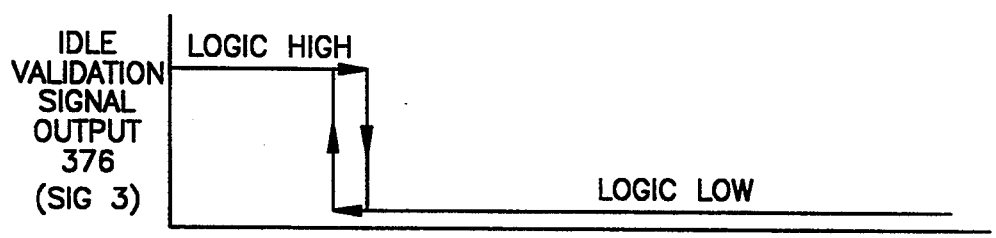

As seen in FIGS. 12B and 12C, the outputs 374, 376 are complementary. A high output from the comparator 340 assures the signal at the inverting (−) input to the comparator 342 is greater than the input 350 and comparator 342 will have a low output 346.

As the throttle pedal 20 moves back and forth from the idle to non-idle ranges, the switch-on (or idle-non-idle) transition point changes depending on which direction the pedal 20 is moving. This hysteresis is needed to avoid output oscillation at the switch point. Assume the output 344 is low. This corresponds to a condition where the reference input 350 is greater than the signal from the wiper arm 150 and the throttle pedal is in the idle zone. When the output changes state, a five volt signal is coupled to the resistor 341 from the output 344. The five volt signal pulls up the voltage at the non-inverting input to the comparator 340 to a level greater than the level it would reach from its connection to the wiper arm 150. Since the reference input 350 is fixed, the voltage at the wiper connection must be lower than the voltage that caused the output 344 to go high. In a preferred embodiment, the voltage must be 1% lower.

An alternate circuit 212' for generating complementary idle validation signals is depicted in FIG. 11. In this Figure, no power input, such as the input 320 shown in FIG. 10, is used. The signals applied across the conductive film element 250 are provided by one of two diodes 412, 414 having anodes coupled to a 5-volt source outside the housing assembly 70.

A power bus 432 in FIG. 11 has been labeled +V since the output at that connection is coupled to one or the other of the two complementary outputs from the comparator amplifiers 420, 430. The +V signal on the bus 432 is applied across two voltage dividers 434, 436. The first voltage divider 434 has an input 440 to a buffer amplifier 442 which applies its output 444 across the conductive film 250. The second voltage divider 436 has an input 450 to a second buffer amplifier 452 having an output 454 connected to an opposite end of the resistive element 250. The resistance values of the two voltage dividers 434, 436 is such that only a percentage of the positive voltage at the bus 432 is applied across the wiper element. This reduces current through the wiper arm 114 and thereby reduces the power consumption of the circuit 212'. The signal output 329' at the wiper arm 114 is connected through a resistor 460 to the two comparator amplifiers 420, 430. These comparator amplifiers have reference inputs coupled to outputs 444, 454 from the buffer amplifiers 442, 452 through voltage divider resistors 462, 464 so that the same signal used to energize the conductive film element 250 is used in defining the reference inputs to the comparators 420, 430.

Two outputs 470, 472 from the comparators are connected to associated field effect transistors 474, 476. Pull-up resistors 478, 480 maintain the gate inputs to these field effect transistors 474, 476 at high levels absent a low output from the comparator amplifiers 420, 430. When a comparator produces a low output, this output is coupled to the gate of an associated field effect transistor. When the field effect transistor 474 conducts, the signal 374' goes low. When the transistor 476 conducts, the signal 376' goes low. Since the signals 374', 376' are complementary, one is high and one is low.

A feedback resistor 444 connected between the output 470 and non-inverting input (+) of the comparator 420 to provide hysteresis in the same manner as the hysteresis described above concerning FIG. 10.

While preferred embodiments of the invention have been illustrated and described in detail, the present invention is not to be considered limited to the precise constructions disclosed. Various adaptations, modifications and uses of the invention may occur to those skilled in the art to which the invention relates and the intention is to cover hereby all such adaptations, modifications and uses which fall within the spirit or scope of the appended claims.

We claim:

1. A unit for providing signals indicative of the position of an engine throttle member comprising:

a) a housing assembly associated with an engine throttle member and defining a chamber for a stator assembly and a rotor assembly, said stator assembly fixed against movement with respect to said housing and said rotor assembly coupled to said throttle member for movement with respect to said stator assembly in relation to movement of said throttle member;

b) said rotor and stator assemblies electrically coupled together for producing first and second continuously variable, ratiometrically identical signals whose values depend upon the position of said throttle member;

c) transmission circuitry for delivering said first signal from said housing assembly for use in controlling the engine operation; and, d) processing circuitry for processing said second signal and producing a throttle position validation signal having a first value when said throttle member is in an engine idle range of positions, said processing circuitry producing a validation signal having a second value when said throttle member moves beyond said idle range of positions.

2. The unit claimed in claim 1 wherein said processing circuitry comprises second signal responsive elements for generating dual, complementary validation signals.

3. The unit claimed in claim 1 wherein said rotor assembly and said stator assembly form parts of a throttle position signal circuit, said throttle position signal circuit connected across a voltage source, said stator and rotor assemblies forming parts of a second throttle position circuit connected across a second voltage source separately from said first throttle position circuit.

4. The unit claimed in claim 1 wherein said signal processing circuitry further comprises circuit elements for maintaining said signal processing circuitry conditioned to produce a validation signal having said second value when said throttle member moves from beyond said idle range of positions a predetermined amount back into said idle range of positions.

5. The unit claimed in claim sensor of claim 3 wherein the first and second throttle position circuits each comprises a resistive path electrically connected across a voltage source and a wiper element engaging said resistive path, one of said wiper element and resistive path fixed with respect to said rotor assembly and the other of said wiper element and resistive path fixed with respect to said stator assembly, said wiper element and said resistive path moving relative to each other to produce one of said first and second signals.

6. The unit claimed in claim 1 wherein said processing circuitry for said second signal comprises an electronic switching element having a first reference input defining a switch point therefor and a second input for receiving said second signal, said switching element having a first state for producing a validation signal having one value when said reference input has a higher value than said second signal, said switching element changing state when said second signal value exceeds the value of said reference input.

7. A unit for providing signals indicative of the position of an engine throttle member comprising:

a) a housing assembly associated with an engine throttle member and defining a chamber for a stator assembly and a rotor assembly, said stator assembly fixed against movement with respect to said housing and said rotor assembly coupled to said throttle member for movement with respect to said stator assembly in relation to movement of said throttle member;

b) said rotor and stator assemblies electrically coupled together for producing first and second signals having values depending upon the position of said throttle member; and, c) processing circuitry for processing said second signal and producing a throttle position validation signal having a first value when said throttle member is in an engine idle range of positions, said processing circuitry producing a validation signal having a second value when said throttle member moves beyond said idle range of positions d) said housing assembly supporting said rotor assembly for rotation with respect to an axis extending into said housing assembly and comprising structure for preventing said rotor assembly from shifting axially or radially relative to said axis, said housing assembly comprising elements for engaging said stator assembly and fixing said stator assembly against motion relative to said axis;

e) said stator assembly comprising a stator body and a film member, said stator body having one face confronting the rotor assembly and a second face, said film member comprising a throttle position signal generating section precisely positioned on and fixed to said one face and a signal processing circuit supporting section positioned on and fixed to said second face, said film member sections joined by a flexible hinge-like film member bridge having conductors printed thereon.

8. The unit claimed in claim 7 wherein said stator member further comprises a terminal construction including a stator body flange extending transverse to said first face, said film member comprising a terminal section secured to said stator member flange and defining electrically conductive terminal pads deposited thereon, said terminal pads electrically connected to said signal processing circuit and said throttle position signal generating section by conductive material deposited on said film member.

9. The unit claimed in claim 8 wherein said terminal section is connected to said signal processing circuit supporting section and said throttle position signal generating section by a flexed hinge-like bridge of said film material.

10. A method of controlling an engine by generating throttle member position signals and producing signals for validating the throttle member position signal comprising the steps of:

a) connecting first and second substantially identical paths of resistive material into separate circuits having substantially identical source voltages;

b) coupling first and second conductive wiper elements to the throttle member in precise alignment with said first and second paths and moving said first and second wiper elements across said respective first and second paths of resistive material in strict accordance with movement of said throttle member;

c) producing first and second continuously variable signals from said respective wiper elements, the first and second signals having values corresponding to throttle member positioning;

d) utilizing said first signal for operating the engine in relation to the throttle member position; and, e) processing the second signal to produce a digital signal to enable validating the first signal, comprising producing a first digital validation signal value when said second signal indicates said throttle member is in an "idle" range of positions and producing a second digital signal value when said second signal indicates the throttle member has moved beyond the "idle" range of positions.

11. The method of claim 10 wherein processing the second signal further comprises creating a second, complimentary digital idle validation signal.

12. The method of claim 10 further comprising disabling the engine from operating at speeds greater than idle speed unless and until the validation signal value corresponds a throttle member position beyond the "idle" range of positions.

* * * * *